Dec. 10, 1946. M. E. BLUMENSTEIN 2,412,246
PROJECTION PICTURE FEEDING MECHANISM
Filed July 28, 1945
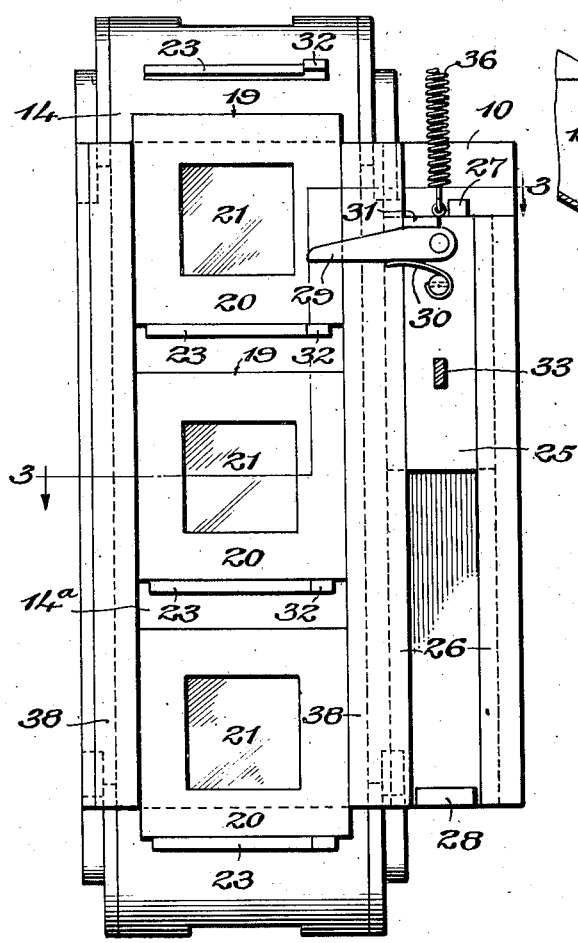
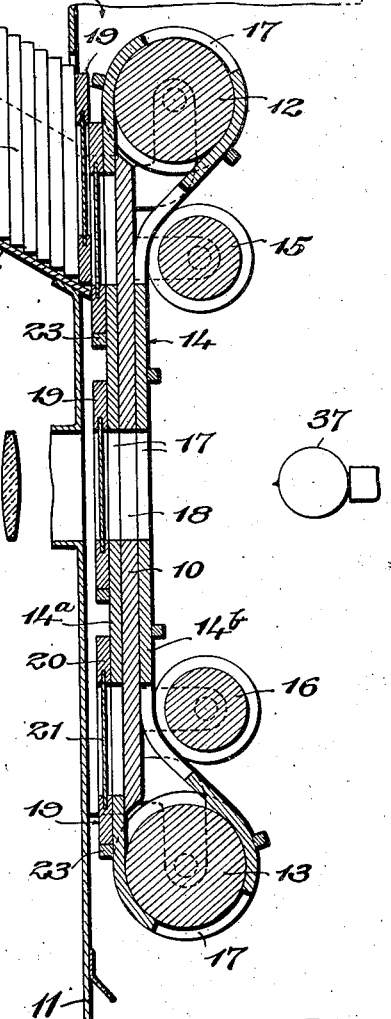
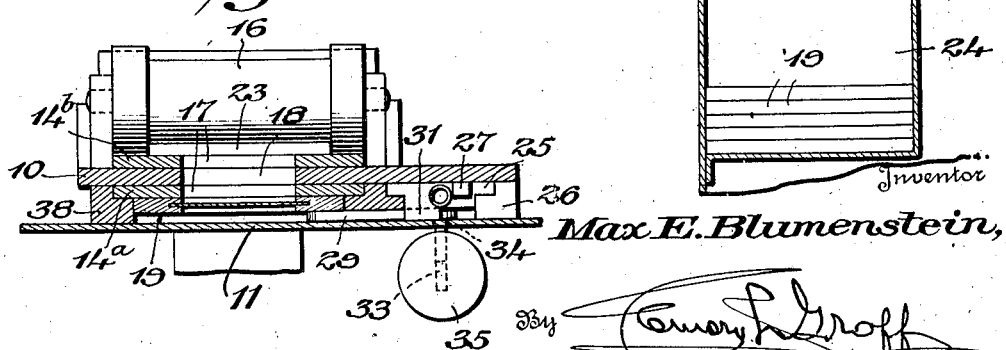
Inventor
Max E. Blumenstein,

Patented Dec. 10, 1946

2,412,246

UNITED STATES PATENT OFFICE 2,412,246

PROJECTION PICTURE FEEDING MECHANISM

Max E. Blumenstein, Hyattsville, Md.

Application July 28, 1945, Serial No. 607,551

3 Claims. (Cl. 88—28)

1

This invention relates to an improved mechanism for feeding picture slides to a viewing position.

The general object of the invention is to provide a simple, practical, inexpensive and reliable step-by-step, finger-operable mechanism which is effective, by each step of operation thereof, to shift one projection picture slide from a viewing position and, simultaneously, to take from a magazine and shift to said viewing position another slide to be viewed.

A special and important object of the invention is to provide a mechanism for the purpose stated embodying stop means to limit each step of operation thereof and to insure that upon completion of any given step of operation thereof a picture slide taken from the magazine and shifted to the viewing position by that step of operation will be disposed accurately in the viewing position.

According to the invention there is provided at the viewing position an aperture with which the successive picture slides are brought into alinement by successive steps of operation of the mechanism and through which said slides are illuminated for viewing purposes, and in this connection another special and important object of the invention is so to construct the mechanism that it acts to close said aperture as one picture slide is being removed from the viewing position and another is being shifted from the magazine to said viewing position.

Another special object of the invention is to provide a mechanism for the purpose stated embodying an endless belt as a slide shifting element, whereby the mechanism always is operable in the same manner and in the same direction to effect shifting of the slides regardless of their number.

With the foregoing and other objects in view, which will become more fully apparent as the nature of the invention is better understood, the same consists in a mechanism for the purpose stated embodying the novel features of construction, combination, and arrangement of parts as will be hereinafter more fully described, illustrated in the accompanying drawing and defined in the appended claims.

In the accompanying drawing, wherein like characters of reference denote corresponding parts in the different views:

Figure 1 is a front elevation of a mechanism constructed in accordance with one practical embodiment of the invention, the front wall of the casing containing said mechanism being removed.

2

Figure 2 is a central, vertical section through the mechanism; and

Figure 3 is a horizontal section on the line 3—3 of Figure 1.

Referring to the drawing in detail, A designates a portion of the casing of a projection picture slide viewing apparatus and 10 designates a vertically disposed wall or panel mounted in any suitable manner within said casing behind the front wall 11 thereof.

Also mounted in any suitable manner within the casing A are upper and lower rollers 12 and 13 over which is trained an endless belt 14 having outer and inner reaches 14a and 14b, respectively, the former of which is suitably constrained to travel against or adjacent to the front face of the wall or panel 10 and the latter of which is suitably constrained, as by means of other suitably mounted upper and lower rollers 15 and 16, respectively, to travel against or adjacent to the rear face of said wall or panel 10.

In the belt 14 are a number of apertures 17 which are of equal sizes and equally spaced apart longitudinally therealong. As said belt is advanced apertures of the respective reaches thereof obviously will become alined, and at a location where two of said apertures become alined the wall or panel 10 is provided with a single aperture 18. In the present instance this aperture 18 is located approximately midway between the rollers 12 and 13 at what may be termed a viewing position for the projection picture slides to be viewed.

The function of the belt 14 is to feed picture slides successively to the viewing position and, of course, to remove viewed slides from that position. To this end, means is provided for delivering to said belt picture slides to be advanced thereby to the viewing position, and other means is provided for advancing said belt in steps each equal to the spacing of the apertures therein to feed the slides successively to the viewing position.

The picture slides are designated as 19 and are of the well-known type comprising a rectangular frame 20 carrying a picture film 21. They are of equal sizes and may be fed to the belt 14 either by hand or from a magazine or any other suitable feeding means. In the present instance a magazine 22 is illustrated as a containing and feeding means for them. This magazine is located at a suitable elevation above the viewing position in front of the front reach 14a of the belt 14 and may be inclined downwardly toward said front reach so that the slides 19, which are stacked vertically therein, will gravitate toward said front reach. Alternatively, the magazine may be disposed horizontally and spring means may be provided to urge the slides toward the front reach 14a.

Advance of the belt 14 is in a direction such that its front reach 14a travels downwardly and its rear reach 14b upwardly. On said belt, below each aperture 17 therein as regards its direction of advance, is a picture slide support 23. These supports may be of any suitable form and are illustrated in the present instance as comprising small ledge-forming pieces suitably fastened to said belt and projecting outwardly therefrom. They are adapted to have the slides 19 rest at their lower edges thereon to support the slides parallel or substantially parallel to the front reach 14a at the front thereof, and they are spaced below the apertures 17 to support the slides with their picture films 21 in alinement with said apertures.

The inner, open end of the magazine 22 is disposed adjacent to the front reach 14a of the belt 14 so that as said belt is advanced and each support 23 moves to a position below said magazine, a slide 19 is deposited thereon to be carried to the viewing position. As the belt is advanced and its lower portion recedes rearwardly about the lower roller 13, the supports 23 are shifted from beneath the slides and the latter gravitate from the mechanism to be collected for repeated viewing whenever desired. In this connection, a suitable receptacle 24 preferably is provided to receive the slides as they gravitate from the mechanism.

The means for effecting step by step advance of the belt 14 comprises a member 25 suitably mounted adjacent to one side of the front reach 14a of the belt 14 for vertical sliding movement. This member may be mounted for sliding movement between a pair of guide rails 26 carried by the wall or panel 10 and its vertical movement is limited by suitable stop means which, in the present instance, are illustrated as comprising upper and lower stop lugs 27 and 28, respectively, which may be carried by the wall or panel 10 and with which the upper and lower edges of said member are respectively engageable.

Pivoted at one end to the member 25 is a pawl 29 which is free to swing downwardly and which is constantly urged upwardly by a light spring 30 against a stop 31 carried by said member 25 and by which its upward swinging movement is limited. The free end of said pawl normally overlies the adjacent marginal portion of the front reach 14a of the belt 14 in advance of said front reach by an amount at least equal to the thickness of the slides 19 for cooperation with projections 32 which are carried by said belt and which extend outwardly therefrom beyond the outer or front faces of the slides 19 to be engaged by said pawl.

The projections 32 may be separate from the supports 23 or they may be in the form of lugs formed as integral parts of said supports as shown. In any event, the relationship of said projections to the apertures 17 and the supports 23, and the relationship of the member 25 to the belt 14 and of the pawl 29 to said member, all are such that when said member 25 is in its uppermost position, as shown in Figure 1, and a pair of the belt apertures 17 are alined with each other and with the aperture 18, the free end of the pawl 29 is disposed a predetermined distance above one of the projections 32, this distance being equal to the amount of upward movement required of the member 25 to permit the pawl 29, during upward movement of the member 25, to snap above the said projection 32. From its uppermost position the permissible amount of downward movement of the member 25 is equal to the spacing of the pawl 29 above the aforesaid projection 32 plus the spacing of the belt apertures 17. It will thus be apparent that with the belt 14 in a position with a pair of its apertures 17 alined at the viewing position and with the member 25 in its uppermost position, downward movement of said member 25 to its lowermost position will result in contact of the free end of the pawl 29 with the projection 32 directly therebelow and advance of the belt one step equal to the spacing of the apertures 17, with the result that a picture slide supported by the belt above the viewing position will be moved downwardly to the viewing position. At the same time, a slide in the viewing position will be moved downwardly from that position to be discharged either by said step of advance of the belt or by a subsequent step of advance thereof, depending upon how far the front reach of the belt extends below the viewing position.

An arm 33 may extend from the member 25 through a slot 34 in the front wall 11 of the casing A and may be equipped at its outer end with a finger piece 35 to be pressed downwardly to slide the member 25 downwardly, and suitable resilient means, such as a coil spring 36, may be provided for returning said member 25 to its uppermost position when finger pressure is removed from said finger piece 35. As the member 25 moves upwardly, the pawl 29 obviously will snap above the next projection 32 for engagement therewith to advance the belt another step by the next downward movement of the member 25. It will thus be apparent that as a result of successive steps of advance of the belt 14, picture slides will be fed successively from the magazine 22 to the supports 23 and will be moved by the belt accurately to the viewing position, while viewed slides will simultaneously be discharged successively from the mechanism.

Behind the viewing position is an electric lamp 37 or any other suitable means for illuminating the films 21 of the picture slides 19 when said films are in the viewing position, while in front of the viewing position is a suitable lens or lens system through which the films are to be viewed and which is, of course, effective to magnify the pictures. The front wall 11 of the casing A has therein, of course, an opening through which the slides may be viewed.

Suitable strips 38 preferably are carried by the wall or panel 10 for cooperation with said wall or panel, to form a track way for the front reach 14a of the belt 14 and to hold said reach in a planar condition as well as to hold the slides 19 against lateral movement relative to said reach. However, any other means may be provided for these purposes.

As the belt is advanced it is apparent that the portions of the same between the apertures 17 therein will act as curtains to cut off light from the lamp 37 at the viewing position during removal of one slide from said position and feeding of another slide to said position.

From the foregoing description considered in connection with the accompanying drawing, it is believed that the construction and operation of the present mechanism will be clearly understood and its advantages appreciated. It is desired to point out, however, that while only a single specific structural embodiment of the invention has been illustrated and described, the same is readily capable of other specifically different structural embodiments within its spirit and scope as defined in the appended claims.

I claim:

1. A mechanism for feeding projection picture slides to a viewing position, said mechanism comprising a vertically disposed wall having therein an aperture defining the viewing position, a vertically disposed endless belt including outer and inner reaches and having therein a plurality of apertures equally spaced apart longitudinally thereof, rollers over which said belt travels and which are disposed to cause the outer and the inner reaches thereof to travel over the outer and the inner faces of said wall, respectively, a member mounted for vertical sliding movement, stop means limiting the sliding movement of said member, resilient means tending constantly to slide said member to its uppermost limit, projections on said belt having the same spacing as the apertures therein, a pawl carried by said member for cooperation with said projections so that each time said member is slid from its uppermost to its lowermost limit the belt is advanced one step equal to the spacing of said belt apertures, said belt apertures being disposed so that for each step of advance of said belt a new aperture of each belt reach is brought into alinement with the aperture in said wall, picture slide supports carried by said belt, said supports being individual to said belt apertures and each being located to support a slide in alinement with its related aperture, and means for depositing onto each support as it reaches a position in advance of the viewing position a picture slide to be carried by said belt to the viewing position.

2. A mechanism for feeding projection picture slides to a viewing position, said mechanism comprising a vertically disposed wall having therein an aperture defining the viewing position, a vertically disposed endless belt, including outer and inner reaches and having therein a plurality of apertures equally spaced apart longitudinally thereof, rollers over which said belt travels, means to cause the outer and the inner reaches of said belt to travel over and adjacent to the outer and the inner faces of said wall, respectively, a member mounted for vertical sliding movement adjacent to said belt, stop means limiting the sliding movement of said member, resilient means tending constantly to slide said member to its uppermost limit, projections on said belt having the same spacing as the apertures therein, a pawl carried by said member for cooperation with said projections so that each time said member is slid from its uppermost to its lowermost limit the belt is advanced one step equal to the spacing of said belt apertures, said belt apertures being disposed so that for each step of advance of said belt a new aperture of each belt reach is brought into alinement with the aperture in said wall, picture slide supports carried by said belt, said supports being individual to said belt apertures and each being located to support a slide in alinement with its related aperture, and a picture slide magazine disposed to have picture slides delivered successively therefrom onto successive supports of said belt as said supports reach positions in advance of the viewing position.

3. A mechanism for feeding picture slides to a viewing position, said mechanism comprising an endless belt including outer and inner reaches and having therein a plurality of apertures equally spaced apart longitudinally thereof, a member mounted for sliding movement longitudinally with respect to said belt between retracted and projected positions, stop means limiting sliding movement of said member, resilient means tending constantly to retract said member, projections on said belt having the same spacing as the apertures therein, a pawl carried by said member for cooperation with said projections so that each time said member is slid from its retracted position to its projected position said belt is advanced one step equal to the spacing of said apertures, said apertures being disposed so that for each step of advance of said belt a new aperture of each belt reach is brought to the viewing position, picture slide supports carried by said belt, said supports being individual to said belt apertures and each being located to support a slide in alinement with its related aperture, and means for depositing onto each support as it reaches a position in advance of the viewing position a picture slide to be carried by said belt to the viewing position.

MAX E. BLUMENSTEIN.